United States Patent
Luna et al.

(10) Patent No.: US 10,090,655 B1
(45) Date of Patent: Oct. 2, 2018

(54) UNIVERSAL INLET CONDUIT BOX AND METHOD FOR COUPLING A SENSOR TO CABLES

(71) Applicant: General Electric Company, Schenectady, NY (US)

(72) Inventors: Edgar Eduardo Luna, Queretaro (MX); Luis Martinez, Queretaro (MX)

(73) Assignee: General Electric Company, Schenectady, NY (US)

( * ) Notice: Subject to any disclaimer, the term of this patent is extended or adjusted under 35 U.S.C. 154(b) by 27 days.

(21) Appl. No.: 15/478,954

(22) Filed: Apr. 4, 2017

(51) Int. Cl.
*H05K 7/14* (2006.01)
*H02G 3/08* (2006.01)

(52) U.S. Cl.
CPC .............. *H02G 3/088* (2013.01); *H02G 3/08* (2013.01); *H02G 3/083* (2013.01)

(58) Field of Classification Search
CPC .... H01C 10/46; H01C 17/242; H01R 4/2433; H01R 4/2462; H01R 4/24; H01R 13/52; H01R 13/66; H01R 13/504; H01R 13/5045; H01R 13/5213; H01R 13/6683; H02G 3/088; H02G 3/08; H02G 3/083; H02G 3/085; H02G 3/18; H02G 3/0468
USPC ..... 174/535, 669; 285/4; 338/195, 234, 226, 338/276, 236, 232
See application file for complete search history.

(56) References Cited

U.S. PATENT DOCUMENTS

| | | |
|---|---|---|
| D47,986 S | 10/1915 | Bissel |
| 3,139,480 A | 6/1964 | Desloge |
| 5,382,752 A | 1/1995 | Reyhan et al. |
| 5,410,916 A * | 5/1995 | Cook ................... G01L 19/0038 600/561 |
| RE35,075 E | 10/1995 | Lammens, Jr. |
| 5,684,253 A * | 11/1997 | Bonne ................. G01L 19/0038 73/706 |
| 5,703,468 A * | 12/1997 | Petrillo ................. H01M 10/44 320/101 |
| 5,939,675 A * | 8/1999 | DeFreitas ............... H02G 3/085 174/669 |
| 6,208,233 B1 * | 3/2001 | Stein, Sr. ............ G01L 19/0084 338/195 |
| 6,315,541 B1 * | 11/2001 | Maeda ............... H01R 13/5219 425/127 |
| 2008/0236862 A1 | 10/2008 | Elder |
| 2009/0130891 A1 * | 5/2009 | Milton ..................... F16L 5/10 439/373 |

(Continued)

OTHER PUBLICATIONS

Roxtec GBTM Sealing Solutions, ROXTEC, 8 pages (2016).

*Primary Examiner* — Timothy Thompson
*Assistant Examiner* — Guillermo Egoavil
(74) *Attorney, Agent, or Firm* — Nixon & Vanderhye P.C.

(57) ABSTRACT

A conduit box assembly including: a housing defining an interior chamber; arms extending outward from the housing, wherein the arms each have a wall defining a passage into the chamber; a compressible seal for each of the arms, wherein each seal has an outer surface configured to seat in and abut the wall of the arm receiving the seal, and a cover configured to attached to the housing and cover an open side of the housing, wherein the cover includes arms extending outward from a center portion the cover and the arms are each configured to cover an open side of a respective one of the arms of the housing and compress the seal in the respective arm.

15 Claims, 5 Drawing Sheets

(56) References Cited

U.S. PATENT DOCUMENTS

| | | | |
|---|---|---|---|
| 2012/0048617 A1* | 3/2012 | Mihara | B60L 3/0069 174/77 R |
| 2015/0084331 A1* | 3/2015 | Barna | H02G 3/088 285/139.2 |

* cited by examiner

UNIVERSAL INLET CONDUIT BOX AND METHOD FOR COUPLING A SENSOR TO CABLES

BACKGROUND OF INVENTION

The invention relates to a conduit box assembly for housing and connecting cables, e.g., wires, conductive strips and conductive lines, for electrical power and data to a sensor and each other.

Conduit boxes, also known as junction boxes, are commonly used to house connections between cables and connections between cables and a sensor. Cables come in a wide variety of sizes and shapes. To accommodate the variety of cables, conduit boxes also come in a variety of sizes and shapes. The varieties of cables and conduit boxes create a difficulty in sealing cables to the conduit boxes because a seal between a specific cable and conduit box must either be designed or tailored for the cable and the conduit box. To install or service a conduit box, a technician must carry a variety of conduit boxes and seals to be sure to have the proper conduit box and seal suited for a specific connection of cables. The need for a variety of conduit boxes and seals creates logistical difficulties in having to have available the variety of conduit boxes and seals, and creates a risk that an improper conduit box or seal may be installed.

Other types of conduit boxes do not provide a seal between the cable and the passage or opening in the housing for the box. Without a seal, the connections housed in the conduit box are subject to the surrounding environment, which may be hostile due to high operating temperatures and caustic gases and liquids in the immediate environment.

Conduit boxes are commonly required to comply with certain certification and rating standards for wiring of power and data cables. Examples of certifications and rating standards include UL (UL LLC), CSA (Canadian Electrical Code), ATEX (explosive atmosphere standard), CE (European Conformity) and IP (Ingress Protection Marking). The various certifications and ratings have caused the variety of conduit boxes to increase as there are now conduit boxes specific to one or more of the certifications or ratings.

Further, conduit boxes are subject to dimensional limitations due to the standards and certifications, and a trend to miniaturize components in plants. The various sizes and shapes of cables to be coupled to a conduit box, the various ratings and certifications applied to conduit boxes, and the trend to reduce the size of conduit boxes, create a need for a universal conduit box that can receive and seal various sizes and shapes of cables, is compliant with applicable certifications and ratings and is simple in construction so that it may be scaled to a reduced size.

SUMMARY OF INVENTION

A conduit box assembly has been conceived and is disclosed here that includes: a housing defining an interior chamber; arms extending outward from the housing, wherein the arms each have a wall defining a passage into the chamber; a compressible seal for each of the arms, wherein each seal has an outer surface configured to seat in and abut the wall of the arm receiving the seal, and a cover configured to attached to the housing and cover an open side of the housing, wherein the cover includes arms extending outward from a center portion the cover and the arms are each configured to cover an open side of a respective one of the arms of the housing and compress the seal in the respective arm.

A conduit box assembly has been conceived and is disclosed herein, the assembly includes: a housing having a bottom, a sidewall extending around a perimeter of the bottom and an open top at an upper edge of the sidewall; arms extending from the housing, wherein the arms each include a continuous wall defining a passage having an open side and the continuous wall of each arm attaches to the sidewall of the housing such that the passage of the arm is aligned with a slot in the housing; seals each configured for a respective one of the arms, wherein each of the seals has an outer surface configured to seat in and abut the continuous wall and an interior surface configured to secure and abut a cable extending through the arm and into an interior chamber of the housing; and a cover configured to attached to the housing and overlap the open top, wherein the cover includes arms extending from a perimeter of the cover and the arms of the cover are each configured to overlap the open side of a respective arm of the housing and compress the seal in the respective arm.

An electrical conduit box assembly has been conceived and is disclosed herein including a detachable cover and housing for accepting multiple inputs of various dimensions, the cover and housing have arms projecting from the housing and cover. The arms of the housing, which may be coupled or uncoupled to the box cover, are configured to accept a variety of inputs. When coupled, the arms secure electrical conduits that may contain electrical wiring. An optional gasket may be present between the housing and the cover of the conduit box to seal the box. The arms may project in an orientation perpendicular to the walls of the cover and the housing, and extend radially from the housing. The orientation of the projections may allow electrical wiring of various shapes and sizes and from multiple directions to be connected to a single housing unit.

A method has been conceived and is disclosed herein to form a conduit box assembly with cable comprising: removing at least one removable layer from an inside surface of a compressible seal to create a passage through the seal tailored to receive a cable; inserting the compressible seal with the cable in the passage in an arm of a housing for the conduit box assembly connecting a conductive wire from the cable to a connector within a housing of the conduit box assembly, wherein the housing includes the arm; fastening a cover over an open end of the housing wherein the cover includes an arm which is seated over an open side of the arm of the housing, and compressing the seal between the arm of the housing and the arm of the cover as the cover is fastened to the housing.

BRIEF DESCRIPTIONS OF THE DRAWINGS

DETAILED DESCRIPTION OF INVENTION

Figure 1:
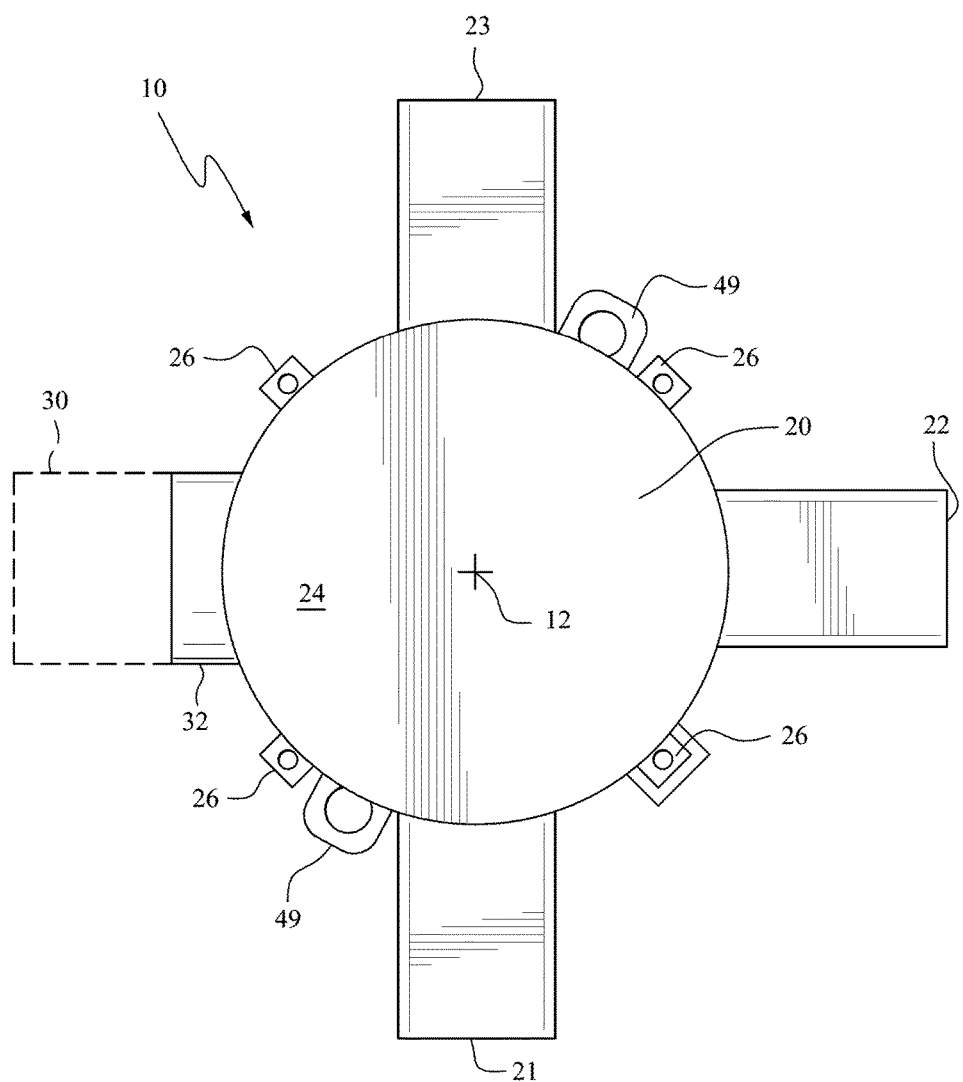
FIG. 1 is a top plan view of an electrical conduit box assembly.
Figure 2:
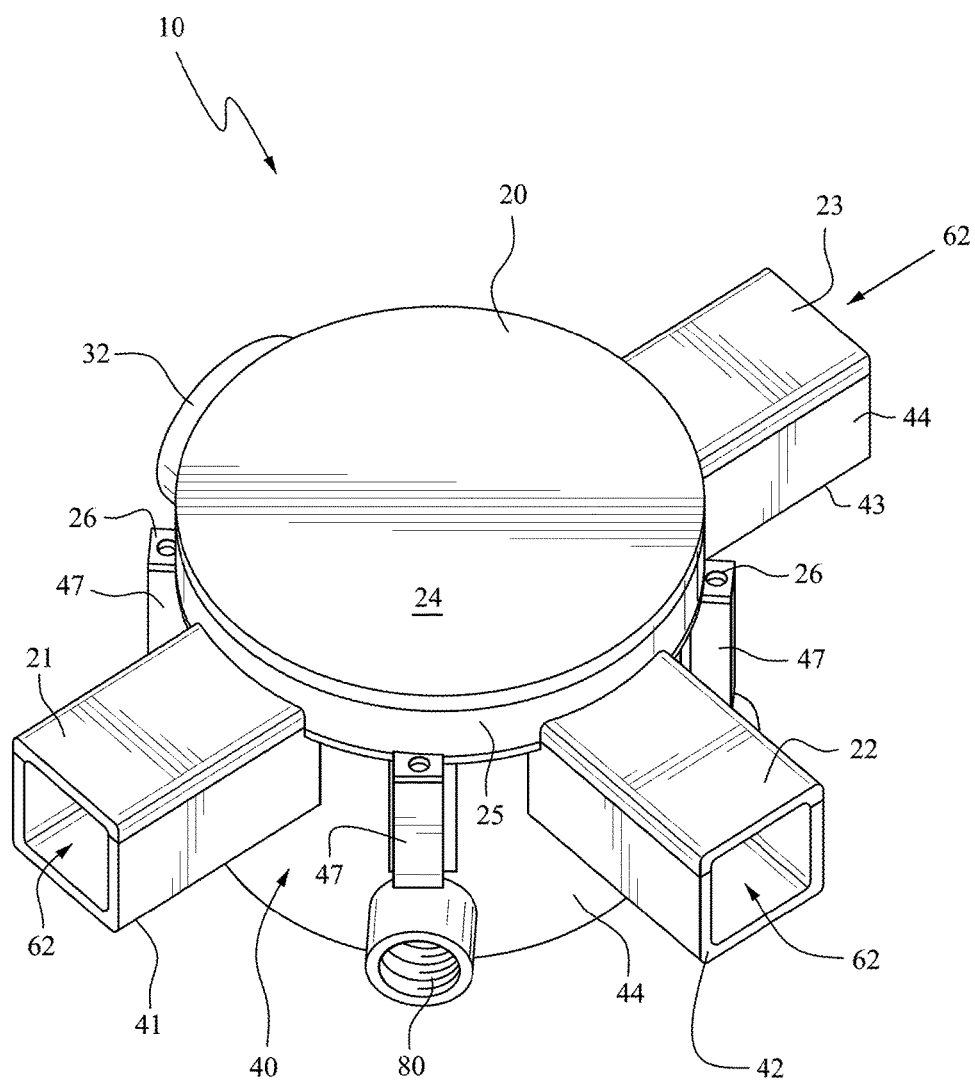
FIG. 2 is a perspective view of the conduit box assembly.
Figure 3:
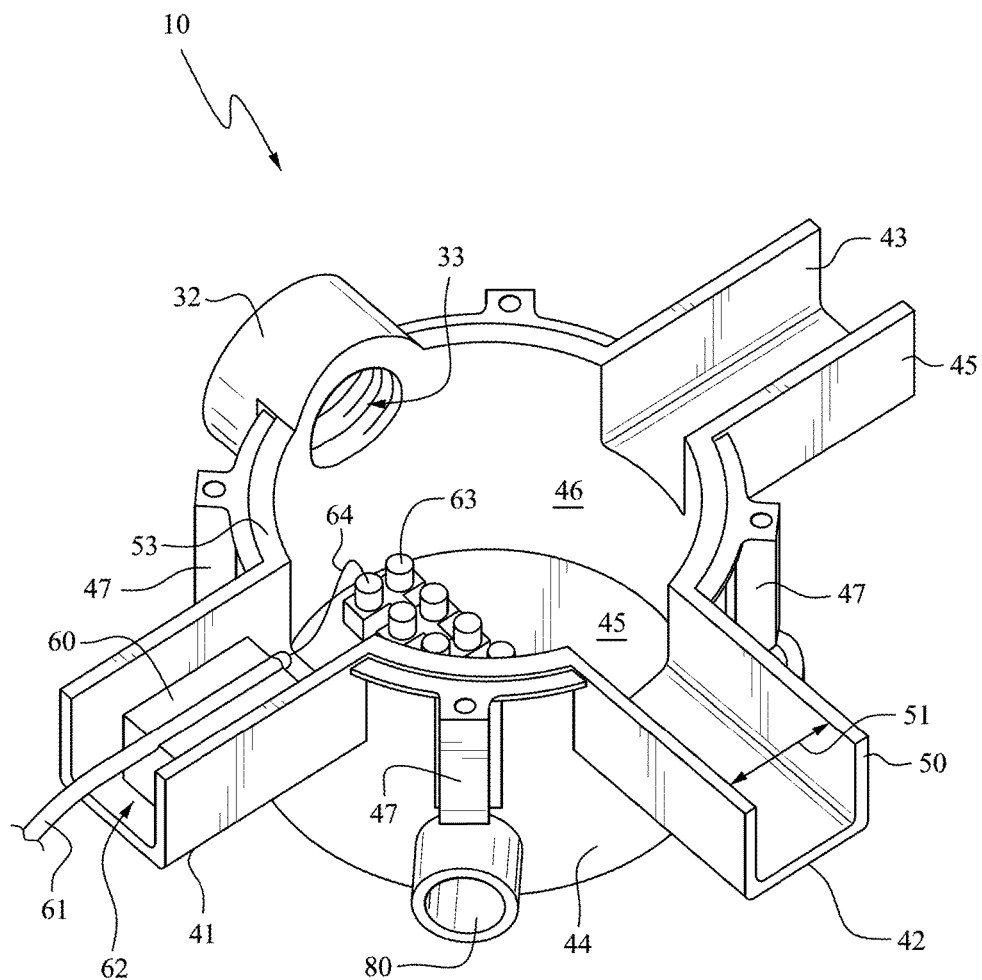
FIG. 3 is a perspective view of a housing of the conduit box assembly.
Figure 4:
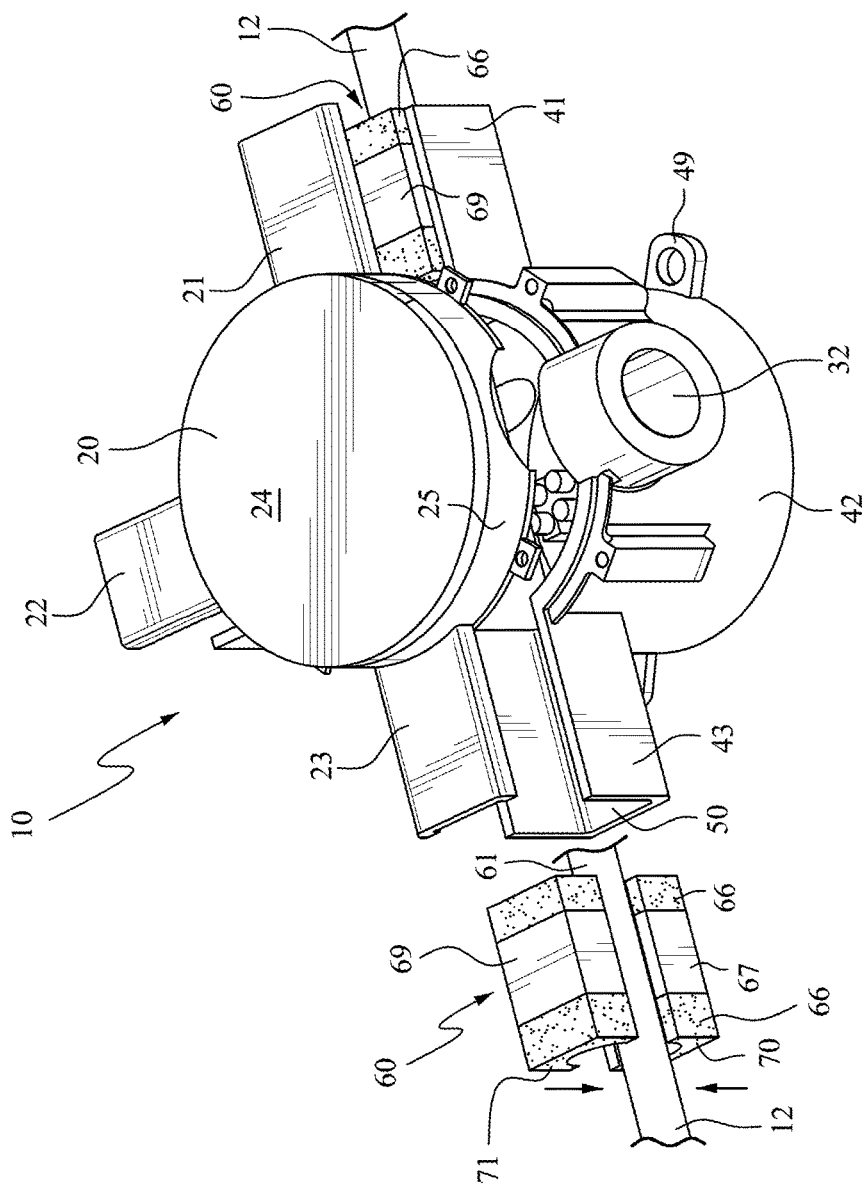
FIG. 4 is an exploded view of the conduit box assembly.

FIGS. 1 to 4 show a conduit box assembly 10 with a detachable cover 20 covering a housing 40 with a hollow interior 44. Arms 41, 42, 43 extend from a sidewall 44 of the housing and corresponding arms 21, 22 and 23 extend from the perimeter of the cover 20. While the cover is seated on the open side of the housing, the arms 21/41, 22/42 and 23/43 form passages 62 for a respective cable 61. Each cable is secured in its respective passage by a compressible seal 60. Only half of the seal 60 is shown in FIG. 3.

The cover 20 may have a circular plate 24 that covers the interior 46 of the housing and a sidewall 25 at a perimeter of the plate 24. The sidewall 25 has a bottom edge that seats on an upper edge of the sidewall 44 of the housing 40. Tabs 26 on the sidewall 25 of the cover 20 align with ribs 47 on the sidewall 44 of the housing. Fasteners, such as screws, extend through the tabs 26 and engage a respective threaded hole in the ribs 47. The fasteners secure the cover to the housing. The sidewall 44 of the housing 40 may include a drain opening 80 liquids from the chamber 46. The drain opening may include an on-off valve or a one-way that allows fluid in the chamber 46 to leave the chamber and prevent fluid from entering the chamber.

The sidewall 44 of housing 40 may be circular in cross section and have a cylindrical shape. The bottom 45 of the housing may be a circular plate joined at its perimeter to the sidewall 44. A tab 49 extending outward from the sidewall 44 may have a hole through which a fastener extends to secure the conduit box assembly 10 to a wall or other external surface. The tab 49 may also provide an external electrical ground connection for the assembly 10.

The interior 44 of the housing is a chamber for the connections between the cables 61 and between the cables and wires from a sensor 30 mounted to the casing. A panel 63 of electrical connectors may be mounted to the bottom 45 of the housing. The panel 63 includes connectors to receive conductive wires from the cables 61 and is configured to provide connection between wires 64 from one cable and wires from another cable and/or to the wires of the sensor 30.

The sensor 30 is connected to a sensor mount 32 on the sidewall 44 of the housing. The sensor mount may include an opening with a threaded wall 33 which engages threads on a base of the sensor 30. Wires from the sensor extend from the sensor into the chamber 46 and connect to the panel 63 in the chamber.

The arms 41, 42, 43 of the housing 40 extend outward from the sidewall 44. The arms may extend outward in a radial direction from a centerline 12 of the conduit box assembly. The arms 41, 42 and 43 and the sensor mount 33 may be arranged around housing such that each is offset by 90 degrees from the other with respect to the centerline 12.

The arms 41, 42 43 have walls 50 that each may be U-shape in cross section. An open side 51 of each wall 50 is open along the length of the arm, or at least along a portion of the length of the arm. The open sides 51 of the arms are each covered and closed by a respective one of the arms 21, 22, 23 on the cover 20. The arms 21, 22, 23 on the cover 20 each align with and cover the open sides 51 of a respective one of the arms 41, 42, 42 on the housing 40.

The passage 62 defined by each of the pair of arms of the housing and cover 41/21, 42/22 and 43/23 receives a cable (s) 61 which is secured to the passage by the seal 60. The passages 62 are substantially larger in cross section, such as having a cross sectional area greater than two, four or six times the cross sectional area of the cable. The large cross sectional area of the arms accommodates a wide variety of sizes and types of cables 61. The seal 60 between the cable and the wall of each arm may be tailored, e.g., changed in shape and size, to retain the cable and fit in the arms.

Figure 5:
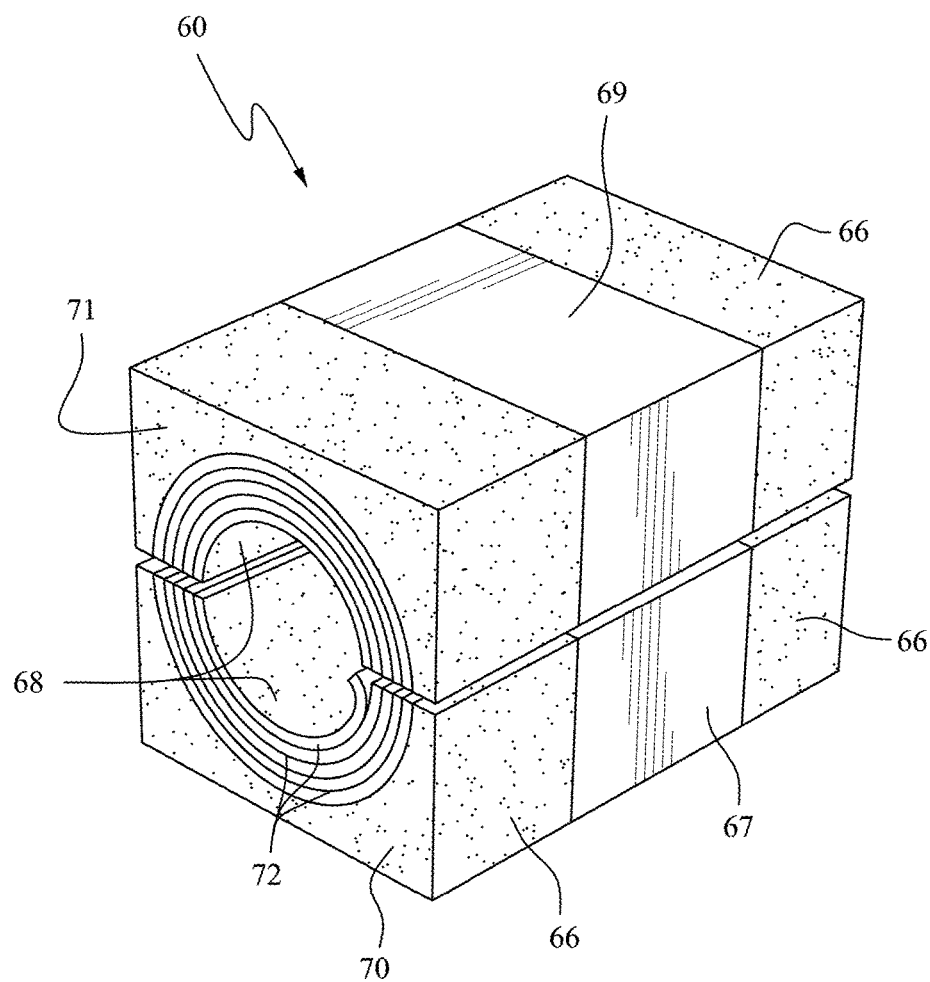
FIG. 5 is a perspective view of a seal for the conduit box assembly.

FIG. 5 shows an exemplary seal 60. The seal may have a shape configured to fit into one of the arms 21/41, 22/41 and 23/43 of the conduit box assembly. For example, the seal may have a rectangular or square in cross section. The seal may be formed of a compressible or deformable material 66, such as an elastomer, rubber, sponge-like material, honeycombed-material or other porous and deformable material.

The seal 60 may include a conductive section 67 which may be a conductive braid or other conductive material incorporated into the compressible or deformable material 66 of the seal. The conductive section 67 provides a conductive path from an inner surface(s) 68 of the seal to the outer surfaces 69. The conductive section 67 may be used to provide a ground connection between the shield of the cable 61 and the conduit box assembly 10.

The seal 60 may be divided in to half sections 70, 71 along the length of the seal. The half sections are separated to allow a cable to be seated against the inner surfaces 68 of the seal. The size and shape of the inner surface 68 may be modified (tailored) to accommodate the cable by removing layers 72 of the seal at the inner surface. The layers are nested in the seal and form the inner surface. The inner surface of the seal, when both half sections are assembled together, forms a passage for a cable By removing an appropriate number of layers 72 from one or both of the half sections 70, 71, the size and shape of the inner surface and the passage defined by the inner surface is enlarged to accommodate a cable to be seated in the seal.

Once the cable is seated in one of the half sections 70 or 71 of the seal, the other half section is placed on the cable and the seal is assembled. The assembled seal 60 is placed in the wall 50 of one of the arms. The placement of the seal in the arm requires a slight compression of the seal. Additional compression will occur when the cover 20 is placed on the housing 40 such that an arm 21, 22, 23 of the cover seats on the seal and further compresses the seal. The compression of the seal in the arms 21/41, 22/42, 23/42 of the assembly 10 increases the ability of the seal to secure the cable to the assembly and prevent fluids from entering the housing through the passage 62 in the arm.

The seal 60 fits securely in the passage 62 of a respective arm and is held in the passage by a friction (interference) fit with the walls of the arm. The compression of the seal 60 between the arms of the cover and the housing assists in securing the seal within the arms (passage 50) and forming a seal in the passage.

Types of cables that may be received by the arms include cables or wires for a 125 or 220 volt (V) alternating current (AC) power, cables or wires for a 24V or other level of direct current (DC) power, and cables for data, such as a coaxial cable or Ethernet cable. Additional feedback inputs or outputs may be utilized if the conduit box is used in a sensor application.

The conduit box assembly 10 may be employed on a variety of cables (i.e. inputs, outputs, etc.) regardless of their shape, manufacture or material. The cables attached to the assembly 10 may be of similar sizes or may vary greatly in size or shape. The conduit box assembly is compact and thus may be used in applications where there is limited space for the assembly.

The conduit box assembly provides an improved apparatus for encapsulating electrical wiring, and would be especially advantageous for its ability to accept multiple unique inputs, effectively reducing the complexity of any electrical system. Specifically, this conduit box is envisioned to be advantageous for use in aeronautic, power generation, and/or related systems, where design efficiency is not only preferred, but also critical. As such, the general purpose of the present invention, which will be described subsequently in greater detail, is to provide a new and improved conduit box to house electrical connections, and its associated methods of assembly and use, which has all of the advantages of the prior art and none of the disadvantages.

The arm or arms 41, 42, 43 of the housing may have equal height and width dimensions (i.e. have a square-shaped cross-sectional profile) to accommodate square-shaped fitting boxes. Rectangular fitting shapes may be preferred over circular profiles for applications where a secure, non-rotatable fitting is found to be preferable. In other instances, rounded or threaded fittings may be preferred for forming rudimentary and securing connections to the conduit box. The conduit box assembly 10 may be formed of metal or other conductive material. Alternatively, the conduit box may be formed of a plastic or other material with conductive strips included in the box to provide ground connections to the cables and sensor.

Because the conduit box assembly is formed of components such as the housing and cover, a seal or gasket 53, such as an O-ring, may be positioned between the perimeter ridge of the cover and the perimeter edge formed by the sidewalls of the housing. Depending on the style of seal used, the barrier may be to prevent the entry of water, debris or hazardous environmental materials into the interior of the conduit box. The edges of the housing and the cover of the box are dimensioned as to be complimentary, with a lower edge and raised edge within the inner wall of the housing. It is along this raised inner wall where a lip or seat is formed that cover securely rest. Where a gasket is employed, the gasket may also rest atop the inner wall. When employed, a gasket may provide an additional layer of protection from to minimize the entry of moisture, dust, or other contaminants into the interior of the housing.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

The invention claimed is:

1. A conduit box assembly comprising:
    a housing having a bottom, a sidewall extending around a perimeter of the bottom and an open top at an upper edge of the sidewall;
    arms extending from the housing, wherein the arms each include a continuous wall defining a passage having an open side and the continuous wall of each arm attaches to the sidewall of the housing such that the passage of the arm is aligned with a slot in the housing;
    seals each configured for a respective one of the arms, wherein each of the seals has an outer surface configured to seat in and abut the continuous wall and an inner surface configured to secure and abut a cable extending through the arm and into an interior chamber of the housing wherein the seal includes a conductor configured to provide an electrical connection between the arm and the cable; and
    a cover configured to attached to the housing and overlap the open top, wherein the cover includes arms extending from a perimeter of the cover and the arms of the cover are each configured to overlap the open side of a respective arm of the housing and compress the seal in the respective arm.

2. The conduit box assembly of claim 1 wherein the inner surface of the seal is formed by an innermost one of nested removable layers.

3. The conduit box assembly of claim 2 wherein a passage for the cable is formed through the seal by the inner surface and the removable layers.

4. The conduit box assembly of claim 1 further comprising a sensor mount extending from the sidewall of the housing, wherein the sensor mount is configured to receive and support a sensor.

5. The conduit box assembly of claim 1 wherein the arm has a U-shape in cross section.

6. The conduit box assembly of claim 1 wherein the seal is configured to abut the respective arm of the cover covering the arm of the housing corresponding to the arm of the housing.

7. A conduit box assembly comprising:
    a housing having a bottom, a sidewall extending around a perimeter of the bottom and an open top at an upper edge of the sidewall, wherein the housing is formed of a conductive material;
    arms extending from the housing, wherein the arms each include a continuous wall defining a passage having an open side and the continuous wall of each arm attaches to the sidewall of the housing such that the passage of the arm is aligned with a slot in the housing;
    seals each configured for a respective one of the arms, wherein each of the seals has an outer surface configured to seat in and abut the continuous wall and an inner surface configured to secure and abut a cable extending through the arm and into an interior chamber of the housing; and
    a cover configured to attached to the housing and overlap the open top, wherein the cover includes arms extending from a perimeter of the cover and the arms of the cover are each configured to overlap the open side of a respective arm of the housing and compress the seal in the respective arm.

8. The conduit box assembly of claim 1 further comprising electrical connectors mounted to an interior surface of the housing.

9. The conduit box assembly of claim 1 wherein two of the arms of the housing extend along a cable through a center axis of the housing and a third of the arms of the housing has a centerline which is perpendicular to the cable through the center axis.

10. A conduit box assembly comprising:
    a housing defining an interior chamber, wherein the housing is formed of a conductive material
    arms extending outward from the housing, wherein the arms each have a wall defining a passage into the chamber;
    a compressible seal for each of the arms, wherein each seal has an outer surface configured to seat in and abut the wall of the arm receiving the seal;
    removable layers in the compressible seal, wherein the removable layers are nested in the seal and an innermost removable layer defines an inner surface of the seal which is configured to receive a cable, and
    a cover configured to attached to the housing and cover an open side of the housing, wherein the cover includes arms extending outward from a center portion the cover and the arms are each configured to cover an open side of a respective one of the arms of the housing and compress the seal in the respective arm.

11. The conduit box assembly of claim 10 further comprising a sensor mount extending from the sidewall of the housing, wherein the sensor mount is configured to receive and support a sensor.

12. The conduit box assembly of claim 10 wherein the wall of the arm has a U-shape in cross section.

13. A conduit box assembly comprising:
a housing defining an interior chamber;
arms extending outward from the housing, wherein the arms each have a wall defining a passage into the chamber;
a compressible seal for each of the arms, wherein each seal has an outer surface configured to seat in and abut the wall of the arm receiving the seal, wherein the seal includes a conductor configured to provide an electrical connection between the arm and a cable in the seal;
removable layers in the compressible seal, wherein the removable layers are nested in the seal and an innermost removable layer defines an inner surface of the seal which is configured to receive the cable, and
a cover configured to attached to the housing and cover an open side of the housing, wherein the cover includes arms extending outward from a center portion the cover and the arms are each configured to cover an open side of a respective one of the arms of the housing and compress the seal in the respective arm.

14. The conduit box assembly of claim 10 wherein the seal is configured to abut one of the arms of the cover.

15. The conduit box assembly of claim 10 further comprising electrical connectors mounted to the bottom plate of the housing.

* * * * *

UNITED STATES PATENT AND TRADEMARK OFFICE
CERTIFICATE OF CORRECTION

PATENT NO. : 10,090,655 B1
APPLICATION NO. : 15/478954
DATED : October 2, 2018
INVENTOR(S) : Edgar Eduardo Luna et al.

Page 1 of 1

It is certified that error appears in the above-identified patent and that said Letters Patent is hereby corrected as shown below:

In the Specification

Column 2, Line 41, "assembly" should read --assembly;--

In the Claims

Claim 1, Column 5, Line 56, "housing" should read --housing,--

Claim 10, Column 6, Line 47, "material" should read --material;--

Signed and Sealed this
Sixth Day of November, 2018

Andrei Iancu
*Director of the United States Patent and Trademark Office*